(12) United States Patent
Miyazaki et al.

(10) Patent No.: US 7,554,700 B2
(45) Date of Patent: Jun. 30, 2009

(54) APPARATUS, METHOD AND PROGRAM FOR CARRYING OUT EMBOSSED PRINTING PROCESSING

(75) Inventors: Mariko Miyazaki, Kanagawa (JP); Hideki Fujimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 687 days.

(21) Appl. No.: 11/049,708

(22) Filed: Feb. 4, 2005

(65) Prior Publication Data

US 2006/0066880 A1    Mar. 30, 2006

(30) Foreign Application Priority Data

Sep. 24, 2004   (JP)   ............................. 2004-278107

(51) Int. Cl.
| | |
|---|---|
| H04N 1/40 | (2006.01) |
| B41C 1/02 | (2006.01) |
| B41C 1/04 | (2006.01) |
| G06F 3/12 | (2006.01) |
| G06F 15/00 | (2006.01) |
| G06K 1/00 | (2006.01) |
| B31F 1/07 | (2006.01) |
| B44C 1/24 | (2006.01) |

(52) U.S. Cl. ...................... 358/3.29; 358/3.28; 101/32
(58) Field of Classification Search .................. 358/1.1, 358/1.18, 3.28, 3.29, 1.9, 2.1; 399/100; 101/32
See application file for complete search history.

(56) References Cited

U.S. PATENT DOCUMENTS

| | | | |
|---|---|---|---|
| 2004/0050269 A1* | 3/2004 | Adamczyk et al. | 101/150 |
| 2005/0007632 A1* | 1/2005 | Miyazaki et al. | 358/1.18 |
| 2005/0128518 A1* | 6/2005 | Tsue et al. | 358/1.15 |

FOREIGN PATENT DOCUMENTS

JP    A-2004-078697    3/2004

* cited by examiner

*Primary Examiner*—Mark K Zimmerman
*Assistant Examiner*—Fan Zhang
(74) *Attorney, Agent, or Firm*—Oliff & Berridge, PLC

(57) ABSTRACT

An embossed printing processing apparatus for carrying out embossed printing by converting attribute values that are extracted from non-embossed image data into height data to create embossed image data, and transmitting the non-embossed image data and the created embossed image data to an image forming apparatus, the embossed printing processing apparatus, includes embossing specification setting pattern storing unit that creates and stores therein embossing specification setting patterns that set conversion specifications for converting the attribute values that are extracted from the non-embossed image data into height data; selecting unit that selects a desired embossing specification setting pattern from among the embossing specification setting patterns stored in the embossing specification setting pattern storing unit in creating the embossed image data from the non-embossed image data; and embossed image data creating unit that creates the embossed image data from the non-embossed image data using the embossing specification setting pattern selected by the selecting unit.

9 Claims, 11 Drawing Sheets

601: DETAIL SETTING SCREEN

EMBOSSING SPECIFICATION DETAIL SETTING

BASIC SETTING

HEIGHT SETTING
○ NUMERICAL VALUE SPECIFYING    HEIGHT [3] mm
⦿ CALCULATING FROM ATTRIBUTE VALUE    ATTRIBUTE VALUE [BRIGHTNESS ▼]    [FORMULA SPECIFYING] — 602
                                                                           — 603

EMBOSSED SHAPE [SEMICIRCULAR] [▼]    COLOR [RED ▼]    [TWO OR MORE COLORS]

ENLARGE/REDUCE [100] %

EMPHASIZING
☐ EMPHASIZING EMBOSSMENT
EMPHASIZING METHOD [EDGING ▼]    COLOR [RED ▼]    [OPTIONAL COLOR]

EMBOSSED SURFACE PATTERN
☐ OUTPUT SHADE PATTERN    PATTERN SELECTION [████████ ▼]

EMBOSSING OUTPUT ORDER SPECIFYING
⦿ PRINT EMBOSSED IMAGE LAST    ○ PRINT EMBOSSED IMAGE FIRST

OVERLAP SPECIFYING
⦿ REFLECT OVERLAP    ○ DO NOT EMBOSS OVERLAP
○ NEGLECT OVERLAP    ○ LOGICAL OPERATION ON OVERLAP
                      [AND ▼]

EMBOSSING SPECIFICATION SETTING PATTERN SETTING
NAME [                    ]    [STORE] — 604
                               [READ-IN] — 605

[OK] [CANCEL]

FIG.6

701: DETAIL SETTING SCREEN

EMBOSSING SPECIFICATION DETAIL SETTING

COLOR

| COLOR (RGB) | HEIGHT (mm) |
|---|---|
| RED (255, 0, 0) | 2 |
| YELLOW (255, 255, 0) | 5 |
| GREEN (0, 255, 0) | 4 |
| ⋮ | ⋮ |

EMBOSSING SPECIFICATION SETTING PATTERN SETTING

NAME [          ]

702 — STORE          READ-IN — 703

704 OK     705 CANCEL

FIG.7

801: DETAIL SETTING SCREEN

EMBOSSING SPECIFICATION DETAIL SETTING

FONT

| FONT | HEIGHT (mm) |
|---|---|
| MING-CHO | 2 |
| GOTHIC | 5 |
| ARIAL | 4 |
| ⋮ | ⋮ |

EMBOSSING SPECIFICATION SETTING PATTERN SETTING

NAME [                    ]

802 — [STORE]        [READ-IN] — 803

804 [OK]    805 [CANCEL]

FIG.8

1001: DETAIL SETTING SCREEN

EMBOSSING SPECIFICATION DETAIL SETTING

MAXIMUM HEIGHT [ 3 ] mm  *1011*

HEIGHT ASSIGNING BY HUE CIRCLE

STARTING POSITION SPECIFYING → FINISHING POSITION SPECIFYING

[ 10Y ▼ ] *1002*     [ 5G ▼ ] *1003*

ANGLE ASSIGNING DIRECTION  [ CLOCKWISE ▼ ] *1004*

HEIGHT CHANGING MODE  [ WAVE SHAPE ▼ ] *1005*

NUMBER OF WAVES  [ 1/2 ▼ ] *1006*

EMBOSSING RANGE     HEIGHT CHANGING MODE

EMBOSSING SPECIFICATION SETTING PATTERN SETTING

NAME [                    ]

*1007* [ STORE ]    [ READ-IN ] *1008*

[ OK ] *1009*   [ CANCEL ] *1010*

FIG.10

APPARATUS, METHOD AND PROGRAM FOR CARRYING OUT EMBOSSED PRINTING PROCESSING

FIELD OF THE INVENTION

The present invention relates to an apparatus, method and program for carrying out embossed printing processing based on embossed image data created from non-embossed image data and a control method thereof, and particularly to an embossed printing processing apparatus which allows embossed image data to be effectively created without the need for the user to set in detail the embossing output specifications each time the embossed image data is created, by using a previously set embossing specification setting pattern.

BACKGROUND OF THE INVENTION

An embossed printing technology which allows carrying out printing in such a way that the intention of the creator is reflected not only in the two-dimensional direction (longitudinal and crosswise) but also in the three-dimensional direction (vertical direction) by using a foaming toner as a printing toner has been conventionally available.

In carrying out such a printing, it was necessary to make the embossing output specification setting, thereby to determine the specifications for converting respective attribute values contained in the non-embossed image data into the heights of the embossed image.

JP 2004-78697 A proposes an image formation method in which embossed image data is created by, in making embossing output specification setting, detecting the attribute values of a non-embossed image such as brightness, chroma, edge of image and image density, and by using appropriate attribute values according to the type of image.

The technology disclosed in JP 2004-78697A attempted to reproduce a feel that the original embossed picture possesses by creating embossed image data according to the type of image of the non-embossed image (oil painting, wall paper, wood-block print, design picture, diagram, photo, natural picture, etc.)

In creating embossed image data according to the type of image, gradation correction and other setting operations have been made, whereby embossed printing of the shape according to the user's preference was performed.

However, in JP 2004-78697 A, the function for storing the results of the corrections and other setting operations in creating embossed image data is not proposed. Therefore, there has been the need for making the gradation correction again each time in creating embossed image data even when the same printing is carried out in the subsequent sessions following the embossed printing once being carried out.

Further, with the technology disclosed in JP 2004-78697A, embossed printing data has been created so that effective embossed printing is carried out according to the type of image of the non-embossed image to be represented (such as oil painting, wall paper, and wood-block print). However, it is not proposed to effectively express the contents drawn in the non-embossed image (for example, reflecting the magnitudes of the graph to the heights of the embossment or embossed printing for only specific characters).

SUMMARY OF THE INVENTION

The present invention has been made in view of the above circumstances and provides an embossed printing processing apparatus which, in creating embossed image data, allows embossed image data to be effectively created without the need for the user setting the embossing output specifications every time in details, by using a previously set embossing specification setting pattern, and a method and program thereof.

According an aspect of the present invention, an embossed printing processing apparatus for carrying out embossed printing by converting attribute values that are extracted from non-embossed image data into height data to create embossed image data, and transmitting the non-embossed image data and the created embossed image data to an image forming apparatus, the embossed printing processing apparatus, includes an embossing specification setting pattern storing unit that creates and stores therein embossing specification setting patterns that set conversion specifications for converting the attribute values that are extracted from the non-embossed image data into height data; a selecting unit that selects a desired embossing specification setting pattern from among the embossing specification setting patterns stored in the embossing specification setting pattern storing unit in creating the embossed image data from the non-embossed image data; and an embossed image data creating unit that creates the embossed image data from the non-embossed image data using the embossing specification setting pattern selected by the selecting unit.

The present invention can be utilized with an embossed image processing apparatus for carrying out embossed printing processing by creating embossed image data from non-embossed image data, and by the user selecting the embossing specification setting pattern according to the type of the non-embossed image data on which embossed printing is to be carried out, the embossed image data can be effectively created.

BRIEF DESCRIPTION OF THE DRAWINGS

Embodiments of the present invention will be described in detail based on the following figures, wherein:

FIG. 6 is a screen configuration illustrating a detail setting screen 601;

FIG. 7 is a screen configuration illustrating a detail setting screen 701;

FIG. 8 is a screen configuration illustrating a detail setting screen 801;

FIG. 10 is a screen configuration illustrating a detail setting screen 1001;

DESCRIPTION OF THE EMBODIMENTS

Hereinbelow, embodiments of an embossed printing processing apparatus, and a control method and a program for performing embossed printing processing according to the present invention will be described in detail with reference to the accompanying drawings.

First, the configuration of a system for implementing the embossed printing processing apparatus according to the present invention will be described with reference to FIG. 1.

Figure 1:
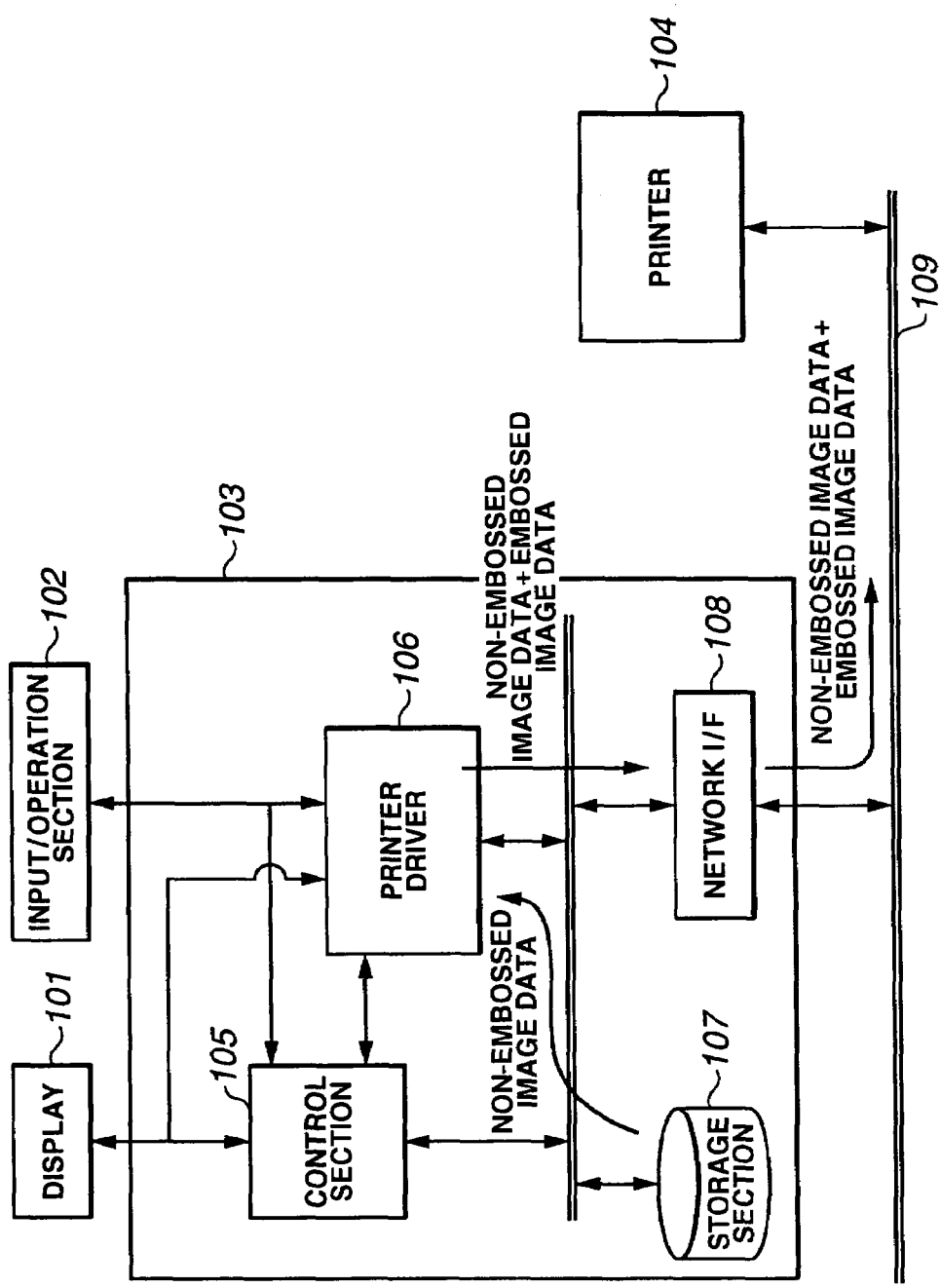
FIG. 1 illustrates a system configuration for implementing an embossed printing processing apparatus according to the present invention.

FIG. 1 illustrates the configuration of a system for implementing an embossed printing processing apparatus according to the present invention.

In the system for implementing the present invention, a printer 104 which is capable of carrying out embossed printing using a foaming toner, and a client PC (personal computer) 103 which transmits embossed image data and non-embossed image data to the printer 104 are connected to each other through a network 108.

To the client PC 103, a display section 101 for displaying an embossed printing setting dialog and the like to the user, and an input/operation section 102, such as a keyboard and a mouse, with which the user transmits instructions for selecting an embossing specification setting pattern or the like are connected.

The client PC 103 has a control section 105 for controlling the client PC 103 and each component thereof, a storage section 107 for storing image data and the like, a printer driver 106 for generating embossed image data from non-embossed image data, and a network interface (hereafter called NW I/F) 108 for exchanging information with the network 109.

The non-embossed image data to be printed out is stored in the storage section 107, and is transmitted from the storage section 107 to the printer driver 106, and then embossed image data is created in the printer driver 106 on the basis of the non-embossed image data according to the embossing specification setting pattern selected by the user.

The embossed image data created in the printer driver 106 and the non-embossed image data are transmitted from the printer driver to the NW I/F 108, and then from the NW I/F 108, transmitted to the printer 104 through the network 108. In the printer 104, embossed printing is carried out on the basis of the embossed image data and non-embossed image data received.

Next, the course of image data being processed will be described with reference to FIG. 2.

Figure 2:
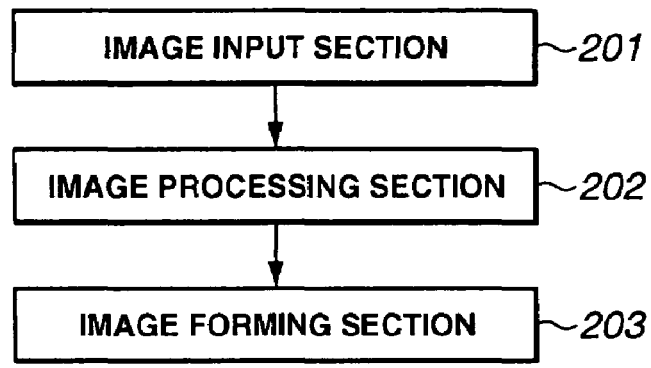
FIG. 2 is a block diagram illustrating the components for image data processing.

FIG. 2 is a block diagram illustrating the components for image data processing.

The image data flows from an image input section 201 to an image processing section 202, and further to an image forming section 203.

In the image input section 201, the non-embossed image data, based on which the embossed printing is carried out is inputted, and then transmitted to the image processing section 202. In the image processing section 202, embossed image data is created from the non-embossed image data according to the embossing specification setting pattern selected by the user. The embossed image data created and the non-embossed image data are transmitted to the image forming section 203.

In the image forming section 203, embossed printing is carried out on the basis of the transmitted embossed image data and non-embossed image data.

The image input section 201 corresponds to the storage section 107 in FIG. 1 that stores image data; the image processing section 202 corresponds to the printer driver 106 in FIG. 1; and the image forming section 203 corresponds to the printer 104 in FIG. 1.

The image input section 201 may be a scanner or a reader which reads out the image data from the recording medium in a digital camera.

Next, the processing with which an embossing specification setting pattern is selected by the user in the printer driver 106 will be described with reference to FIGS. 3 through 5.

Figure 3:
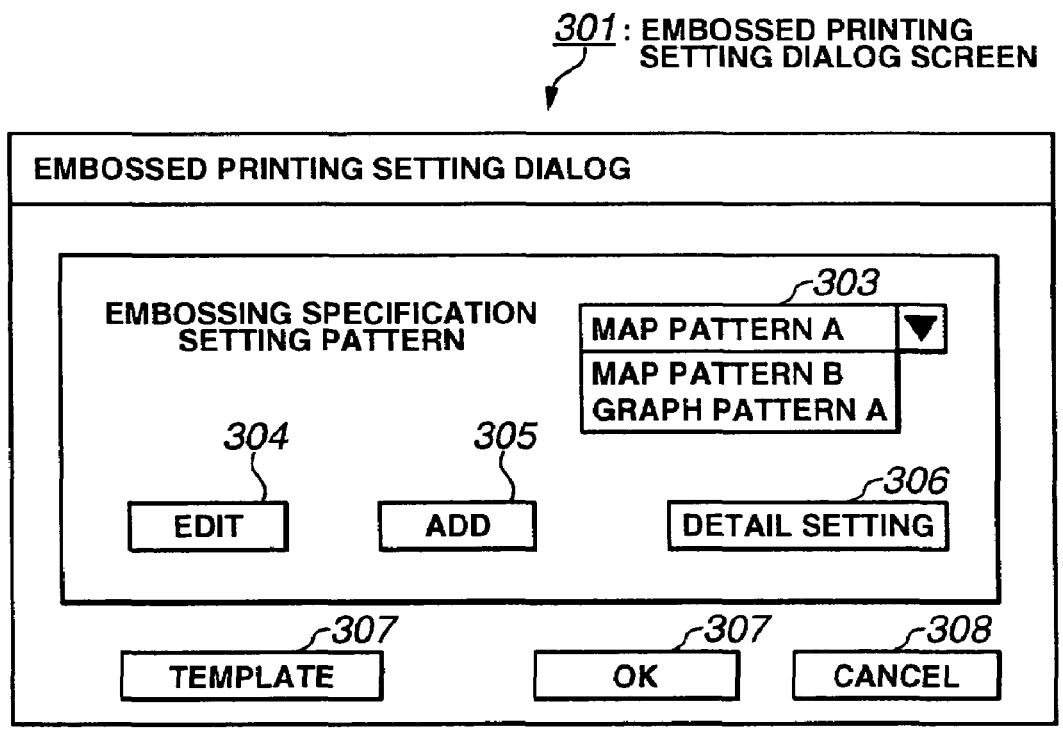
FIG. 3 is a screen configuration illustrating an embossed printing setting dialog screen 301 which is displayed in the display section 101 when selecting an embossing specification setting pattern.

FIG. 3 is a screen configuration illustrating an embossed printing setting dialog screen 301 which is displayed in the display section 101 when selecting an embossing specification setting pattern.

In performing the embossed-printing from the non-embossed image data stored in the storage section 107, the user carries out the operation from the input/operation section 102 to cause the embossed printing setting dialog screen 301 to be displayed in the display section 101 from an application for editing the non-embossed image data, and selects the embossing specification setting pattern from the displayed embossed printing setting dialog screen 301.

Now, the processing which is carried out in the printer driver 106 when the user selects an embossing specification setting pattern in which the embossing output specifications for converting non-embossed image data into the height for an embossed image are given will be described with reference to FIG. 4.

Figure 4:
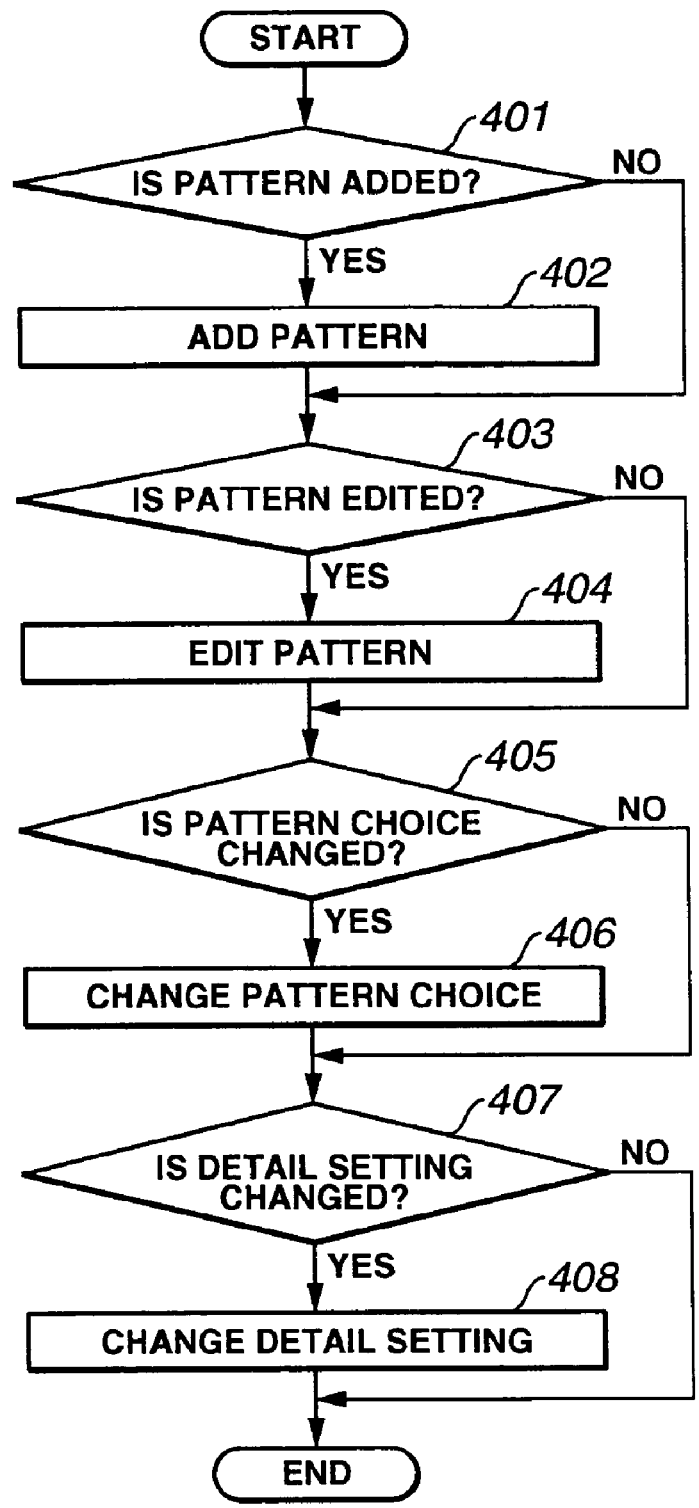
FIG. 4 is a flow chart illustrating the flow of the processing which is carried out when the user selects an embossing specification setting pattern on the embossed printing setting dialog screen 301.

FIG. 4 is a flow chart illustrating the flow of the processing which is carried out when the user selects an embossing specification setting pattern on the embossed printing setting dialog screen 301.

Figure 5:
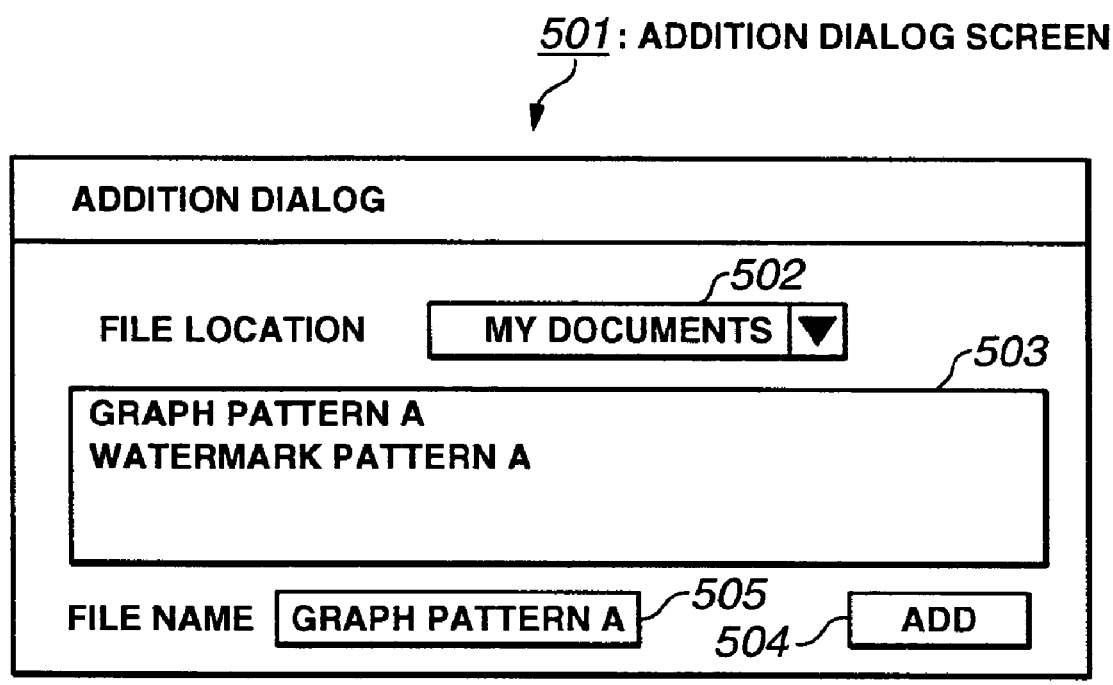
FIG. 5 is a screen configuration illustrating the addition dialog screen 501.

When the embossed printing setting dialog screen 301 is displayed in the display section 101, and the user adds a pattern (YES at step 401), the user depresses an addition button 305 on the embossed printing setting dialog screen 301 to open an addition dialog screen 501 as shown in FIG. 5, and add an embossing specification setting pattern.

Now, the addition dialog screen 501 will be described with reference to FIG. 5.

FIG. 5 is a screen configuration illustrating the addition dialog screen 501.

On the addition dialog screen 501, the user selects the file location in the combo box 502 to indicate the embossing specification setting patterns which are in the location as indicated in the combo box 502, in a box 503; selects a desired embossing specification setting pattern from the box 503 to indicate it in a box 505; and by depressing an addition button 504, can add the embossing specification setting pattern to the combo box 303 on the embossed printing setting dialog screen 301.

Returning to the flow chart shown in FIG. 4, when an embossing specification setting pattern has been added from the addition dialog screen 501 (at step 402), or when there is no need for adding an embossing specification setting pattern (NO at step 401), then it is determined whether the embossing specification setting pattern is to be edited (at step 403).

In editing the embossing specification setting pattern, an editing button is depressed, and the name of a particular embossing specification setting pattern indicated in the combo box 303 and the order of the choices to be indicated in combo box are edited.

After the name of a particular embossing specification setting pattern is edited, or when there is no need for editing the name, the processing proceeds to the next step.

Then, when necessary, from the embossing specification setting pattern indicated in the combo box, the user changes the choice of embossing specification setting patterns for creating effective embossed image data from non-embossed image data that are indicated in the combo box (at step 406).

When the choice of embossing specification setting patterns has been changed, the processing proceeds to the next step.

When the user changes the detail setting of the embossing specification setting pattern, the user depresses a detail setting button 306, and for changing the detail setting, the detail setting screen according to the embossing specification setting pattern selected by the user is displayed (at step 409).

For the detail setting screen, detailed description will be given later.

When all the settings for the embossing specification setting pattern are completed, and an OK button 307 is depressed, the selection of the embossing specification setting pattern is finished.

When the embossing specification setting pattern has been selected, embossed image data is created from the non-embossed image data with the embossing specification setting pattern selected, and then transmitted to the printer 104 for carrying out embossed printing.

When the non-embossed image data is transmitted to the printer 104 as it is without carrying out embossed printing, a cancel button 308 is depressed.

The operations, i.e., adding an embossing specification setting pattern (at step 401), editing an embossing specification setting pattern (at step 403), changing the choice of embossing specification setting patterns (at step 406), and changing the detail setting (at step 409) need not be carried out in this order, and the system may be adapted such that these operations can be carried out in any order from the embossed printing setting dialog screen 301.

Next, for the detail setting screen, which allows the detail setting to be changed, detailed description will be given with reference to FIGS. 6 through 10.

FIG. 6 is a screen configuration illustrating a detail setting screen 601.

The detail setting screen 601 is a template for setting the embossing specifications which are required to create embossed image data from the non-embossed image data, providing a detail setting screen with which the height of the emboss is set according to the attribute values of the non-embossed image data, such as the brightness, the chroma, the edge, and the image density.

Depending upon the embossing specification setting pattern selected by the user from the embossed printing setting dialog screen 301, the detail setting screen 601 is displayed for changing the detail setting.

With the detail setting screen 601, the height for embossed printing is determined according to the attributes of the non-embossed image data, such as the brightness, the chroma, the edge, and the image density, thus, for a map in which the difference between contour lines is indicated by the difference in brightness between colors given to the contour lines, reflecting the difference in brightness to the height for embossed printing allows the conditions of the contour lines, which are non-embossed image data, to be effectively expressed in the direction of height in the embossed printing (the effect of such printing will be described in detail later).

In the field for height setting that is displayed in the basic setting in the detail setting screen 601, the height can be specified from the attribute value, and the attribute value to be reflected to the height is selected from the combo box 603.

Also, with a formula specifying button 602, the value as a result of the mathematical processings, such as multiplication and addition, from plural attribute values may be assigned as the height.

In addition to the height specification, the embossed shape and color specification for a portion to be subjected to embossed printing, the specification of emphasizing, such as edging, the shade pattern specification, the embossing output order specification, the overlap specification, and the like can be selected.

Further, the detail setting screen 601 can also be used as a screen for storing the embossing specification setting pattern, and the contents which have been set in the detail setting screen 601 can also be stored by entering a new name as a new embossing specification setting pattern in the field of the embossing output setting pattern in the detail setting screen 601, and depressing a store button 604.

In the above-described manner, by changing the embossing output setting pattern in the detail setting screen 601, and storing it with a new name, an embossed printing setting pattern that can also be used in the future embossed printing can be created.

Further, by depressing a read-in button 605 in the detail setting screen 601, the embossing specification setting pattern of the same template as that shown in the detail setting screen 601 can be taken from an external terminal or storage medium to display the details of the embossing specifications on the screen.

FIG. 7 is a screen configuration illustrating a detail setting screen 701.

The detail setting screen 701 is a template for setting the embossing specifications which are required to create embossed image data from the non-embossed image data, providing a detail setting screen in which the height of the embossed image is set according to the color set on the non-embossed image data.

Depending upon the embossing specification setting pattern selected by the user from the embossed printing setting dialog screen 301, the detail setting screen 701 is displayed for changing the detail setting.

In FIG. 7, a table with which the height is determined according to the color is disposed.

Under the table with which the height is determined according to the color, a store button 702 which allows the new contents to be stored with a new name and a read-in button 703 which can read-in the embossing specification setting pattern of the same template as that shown in the detail setting screen 701 from an external terminal or storage medium to display the set contents on the detail setting screen 701 are disposed.

By operating the store button 702, the embossing output setting pattern in the detail setting screen 701 is changed, and stored with a new name, thus an embossed printing setting pattern that can also be used in the future embossed printing can be created.

In the lowest area, an OK button 704 for applying the contents set in the detail setting screen 701 and returning to the original screen, and a cancel button 705 for returning to the original screen without the contents being applied are disposed.

When a road or a special facility is expressed with a specific color on the map data, the template as shown in the detail setting screen 701 is used for specifying the height by color, and thus an embossed specification pattern for map, which allows only a particular road or a special facility to be embossed printed for emphasizing, can be created.

Next, FIG. 8 is a screen configuration illustrating a detail setting screen 801.

The detail setting screen 801 is a template for setting the embossing specifications which are required to create embossed image data from the non-embossed image data, providing a detail setting screen with which the height of the emboss is set according to the font set on the non-embossed image data.

Depending upon the embossing specification setting pattern selected by the user from the embossed printing setting dialog screen 301, the detail setting screen 801 is displayed for changing the detail setting.

In the detail setting screen 801, a table with which the height is determined for each font is disposed.

Under the table with which the height is determined for each font, a store button 802 which allows the set contents to be stored with a new name, and a read-in button 803 which can read-in the embossing specification setting pattern of the same template as that shown in the detail setting screen 801 from an external terminal or storage medium to display the set contents on the detail setting screen 801 are disposed.

By operating the store button 802, the embossing output setting pattern in the detail setting screen 801 is changed, and stored with a new name, thus an embossed printing setting pattern that can also be used in the future embossed printing can be created.

In the lowest area, an OK button 804 for applying the contents set in the detail setting screen 801 and returning to the original screen, and a cancel button 805 for returning to the original screen without the contents being applied are disposed.

When map data, which is non-embossed image data, is to be embossed printed, entering a specific map symbol with a particular font and setting in the detail setting screen 801 such that only the font is embossed printed will cause only the specific map symbol among the map symbols on the map data to be embossed printed for increasing conspicuousness.

Figure 9:
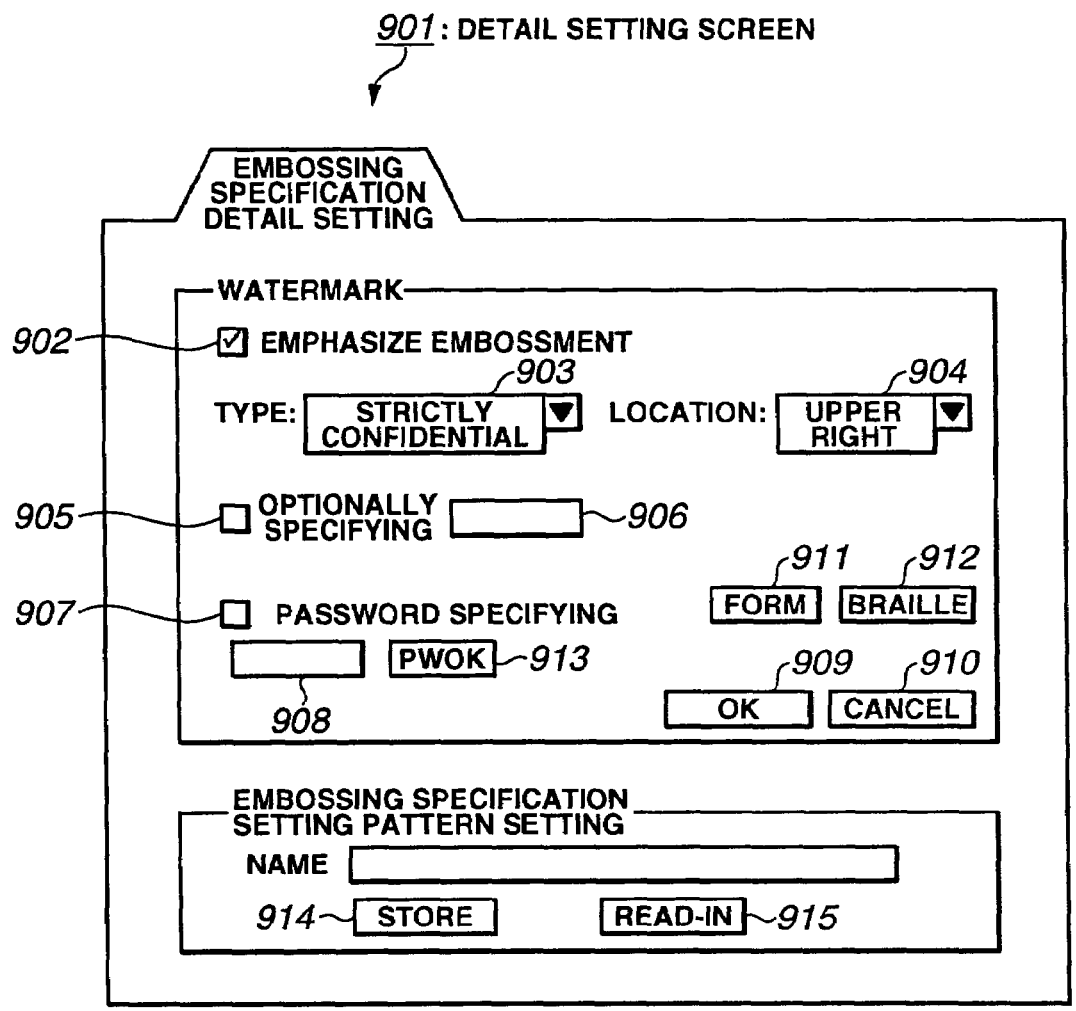
FIG. 9 is a screen configuration illustrating a detail setting screen 901.

Next, FIG. 9 is a screen configuration illustrating a detail setting screen 901.

The detail setting screen 901 is a detail setting screen which displays a template for setting the embossing specifications to create an embossed-printing as a water mark pattern on the screen for the non-embossed image data.

Depending upon the embossing specification setting pattern selected by the user from the embossed printing setting dialog screen 301, the detail setting screen 901 is displayed for changing the detail setting.

A water mark pattern is created by utilizing the embossed printing system to carry out embossed-printing such that minute concavities and convexities are superposed on the non-embossed image data, which is the original data. When the paper which is thus embossed printed is copied, the light applied to the paper produces minute shades of the concavities and convexities given by the embossed-printing, and such shades are also copied, thereby the copied shades functioning as a watermark.

As with the detail setting screen 601, 701, and 801, the detail setting screen 901 also has a function which stores the set contents with a new name with the operation of a store button 914, and a function which, with the operation of a read-in button 915, reads-in the embossing specification setting pattern of the same template as that shown in the detail setting screen 901 from an external terminal or storage medium to display the set contents.

By operating the store button 914, the embossing output setting pattern in the detail setting screen 901 is changed, and stored with a new name, thus an embossed printing setting pattern that can also be used in the future embossed printing can be created.

On the detail setting screen 901, various operation buttons and the like for detail setting of the watermark are disposed.

When the user creates a watermark, a check box 902 is checked, the type of the watermark is selected from a combo box 903, and the location where the watermark is created is selected from a combo box 904.

Besides the types of watermark that can be selected from the combo box 903, any characters that are required by the user can be printed into the paper as a watermark by checking a check box 905, and entering those characters in a box 906.

The system can be configured so that the printing inhibition of the watermark will not be released unless the inhibition release is password-authenticated.

When the user checks a check box 907, enters the password in a box 908 for entering password, and depresses the OK button, then when the detail setting screen 901 is again opened, then as long as the password is not entered, all the buttons except for an OK button 909 and a cancel button 910 are inoperative. Then, when the password is entered in the box 908, the PWOK button 913 is depressed, and the password entered matches to the password registered, all the buttons other than the OK button 907 and the cancel button 910 are also made operative, and thus the check entered in the check box 902 can be removed for canceling the watermark printing.

The OK button 909 has a function which applies the contents set in the detail setting screen 901 and returns to the original screen, and the cancel button 910 has a function which returns to the original screen without the contents being applied.

In the above-described manner, in the detail setting screen 901, the setting for creating embossed image data as a watermark can be carried out from the non-embossed image data, which is the original data.

If a foaming toner is used for watermarking in the embossed-printing, the watermark can be provided without an unnecessary pattern being added to the original document, because the foaming toner is white.

Further, because the toner is foamed at the time of fixing, the watermark pattern can be created on a plain printing paper rather than a special paper.

In the detail setting screen 901, a braille button 912 or a form button 911 can be used for setting such that, besides the embossed pattern of a watermark, an embossed pattern of braille, form, or the like is created.

FIG. 10 is a screen configuration illustrating a detail setting screen 1001.

The detail setting screen 1001 is a template for setting the embossing specifications which are required to create embossed image data from the non-embossed image data, providing a detail setting screen with which the height of the emboss is set according to the color set on the non-embossed image data.

Depending upon the embossing specification setting pattern selected by the user from the embossed printing setting dialog screen 301, the detail setting screen 1001 is displayed for changing the detail setting.

In the detail setting screen 1001, the height can be assigned on the hue circle.

In the field for assigning the height on the hue circle in the detail setting screen 1001, an input field 1011 for entering the maximum value of height in setting the height on the hue circle is provided.

In the field for assigning the height on the hue circle that is located under the input field 1011 for entering the maximum value, a combo box 1002 for defining the starting position in the hue circle and a combo box 1003 for defining the finishing position in the hue circle are provided, and a combo box 1004 for selecting the angle assigning direction, a combo box 1005 for selecting the way of changing in the height direction, and a combo box 1006 for selecting the number of waves are displayed. In the detail setting screen 1001 as shown in FIG. 10, the maximum value of height is specified to be 3 mm, a color of 10Y being specified in the combo box 1002 for defining the starting position, and a color of 5G being specified in the combo box 1003 for defining the finishing position.

In the combo box 1004 for selecting the angle assigning direction, a "clockwise" direction is specified; in the combo box 1005 for selecting the way of changing in the height direction, a "wave shape" change is specified; in the combo box 1006 for selecting the number of waves, "1/2" is specified; and as a result of these, the mode of change in the height direction with color is displayed in the lowest area in the field for assigning the height on the hue circle. Under the field for assigning the height on the hue circle, a store button 1007 which allows the set contents to be stored with a new name, and a read-in button 1008 which can read-in the embossing specification setting pattern of the same template as that shown in the detail setting screen 1001 from an external terminal or storage medium to display the set contents on the detail setting screen 1001 are disposed.

By operating the store button 1007, the embossing output setting pattern in the detail setting screen 1001 is changed, and stored with a new name, thus an embossed printing setting pattern that can also be used in the future embossed printing can be created.

In the lowest area, an OK button 1009 for applying the contents set in the detail setting screen 1001 and returning to the original screen, and a cancel button 1010 for returning to the original screen without the contents being applied are disposed.

According to an embossing specification setting pattern selected in the combo box 303 in the embossed printing setting dialog screen 301, the detail setting screen among the detail setting screens as shown in FIG. 6, FIG. 7, FIG. 8, FIG. 9, and FIG. 10 that corresponds to the embossing specification setting pattern is displayed, however, to a single embossing specification setting pattern, plural embossing specification setting patterns may be correlated and displayed.

Further, when plural embossing specification setting patterns are correlated to a single embossing specification setting pattern, the system may be adapted such that some of the embossing specification setting patterns which are correlated can be excepted from the correlations.

Further, after, from the embossed printing setting dialog screen 301, the template button 307 being operated to invoke the detail setting screen for carrying out the detail setting of a particular embossing specification setting pattern that is shown in FIG. 6, FIG. 7, FIG. 8, FIG. 9, or FIG. 10, the embossing specification setting pattern may be provided with a name and stored as an embossing specification setting pattern.

Next, how non-embossed image data has been actually and effectively embossed printed by the system configured with an embossed printing processing apparatus according to the present invention will be described with reference to the accompanying drawings.

Figure 11A:
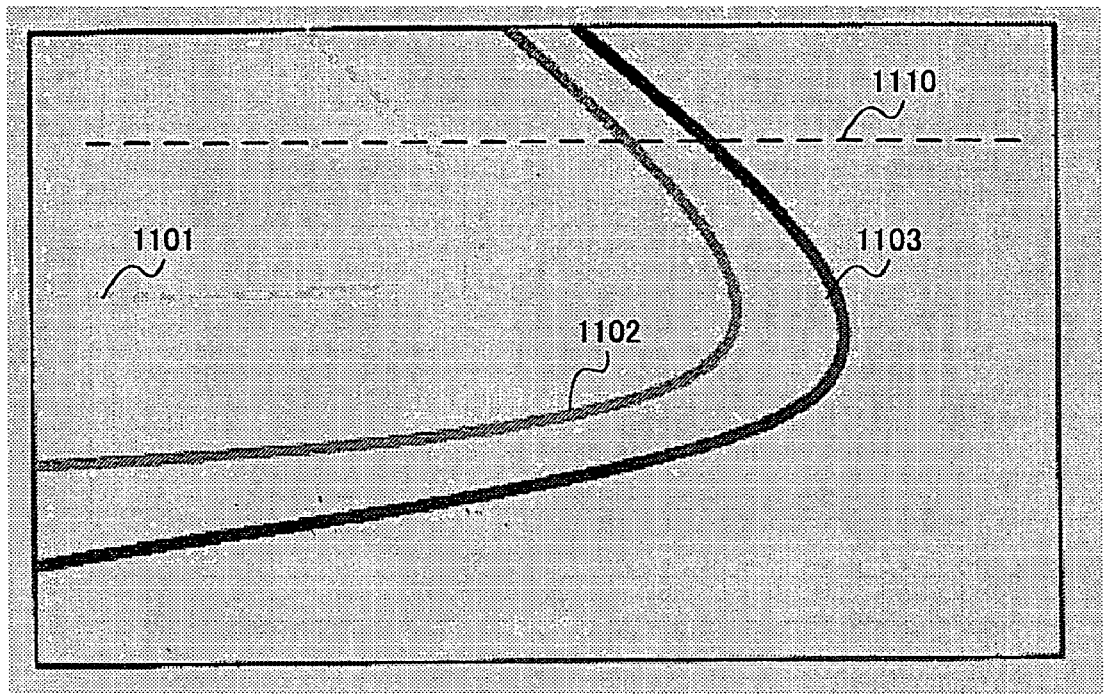
FIGS. 11A and 11b are explanatory drawings respectively illustrating the results of the embossing specification setting pattern of the map pattern A being selected from the embossed printing setting dialog screen 301, and a map, which is non-embossed image data, being effectively embossed printed.
Figure 11B:
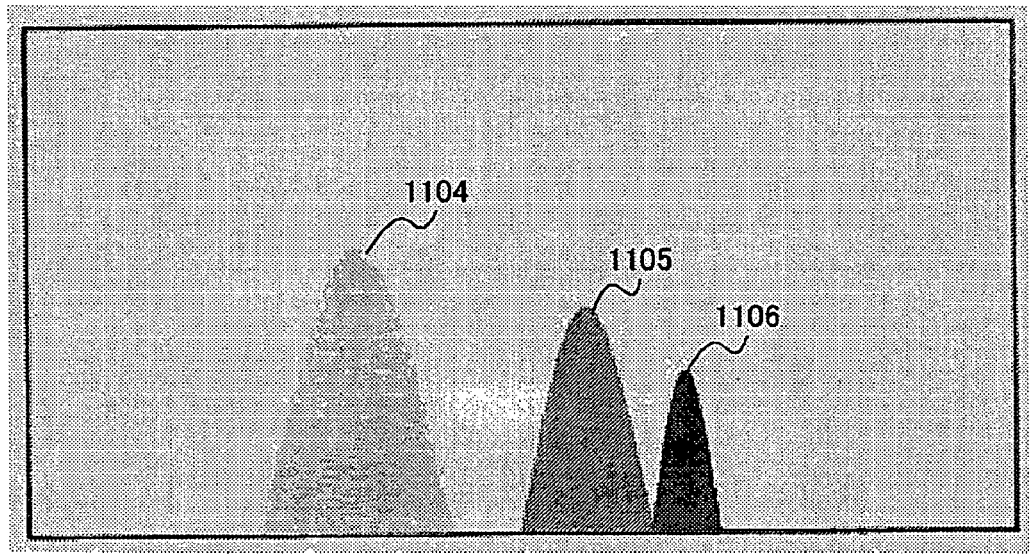

FIGS. 11A and 11B are explanatory drawing illustrating the results of the embossing specification setting pattern of the map pattern A being selected from the embossed printing setting dialog screen 301, and a map, which is non-embossed image data, being effectively embossed printed.

FIG. 11A illustrates how contour lines which are provided with colors having different brightnesses in a map are embossed printed.

The contour line 1101, the contour line 1102, and the contour line 1103 are given with colors having different brightnesses on the map, representing the difference in topographical height.

The positional relationship among the points as represented by the respective contour lines is such that the contour line 1101 is the highest and the contour line 1103 is the lowest.

FIG. 11B illustrates a sectional view when the map providing the contour lines as shown in FIG. 11A that are embossed printed is cut along the line 1110.

The sectional views when the contour line 1101, the contour line 1102, and the contour line 1103 are cut along the line 1110 are a sectional view 1104 in FIG. 11B, which is of the portion equivalent to the contour line 1101; a sectional view 1105 in FIG. 11B, which is of the portion equivalent to the contour line 1103; and a sectional view 1106 in FIG. 11B, which is of the portion equivalent to the contour line 1103.

Thus, it can be seen that a contour line representing a higher point above sea level is printed such that the height as an embossed print is also higher.

In this way, by selecting the map pattern A, which provides an embossing specification setting pattern for providing different heights for portions having different brightnesses, an embossing output approximated to the actual topographical features can be obtained.

When the original data of the non-embossed printing image which the user wants embossed printing is map data, the embossing specification setting pattern of the map pattern A is selected from the embossed printing setting dialog screen 301, and the map data is effectively embossed printed as shown in FIG. 11, for example.

Figure 12A:
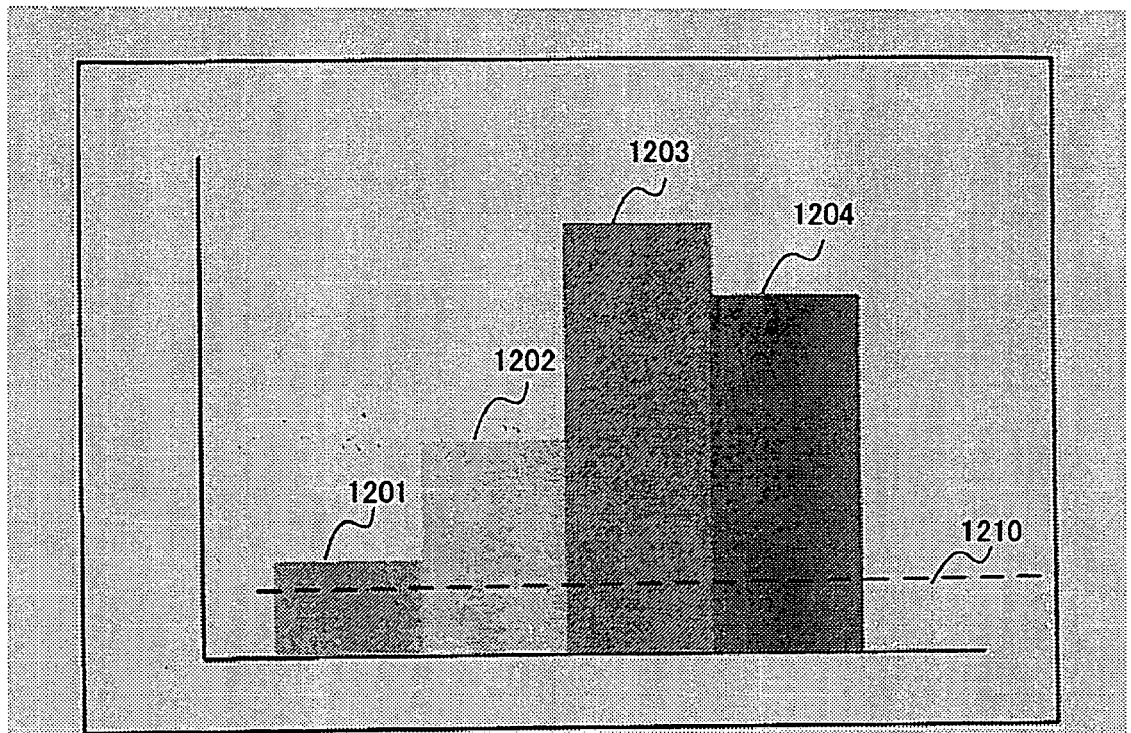
FIGS. 12A and 12B are explanatory drawings respectively illustrating the results of a graph, which is non-embossing image data, being effectively embossed printed by selecting the embossing specification setting pattern of the graph form pattern A in the embossed printing setting dialog screen 301.
Figure 12B:
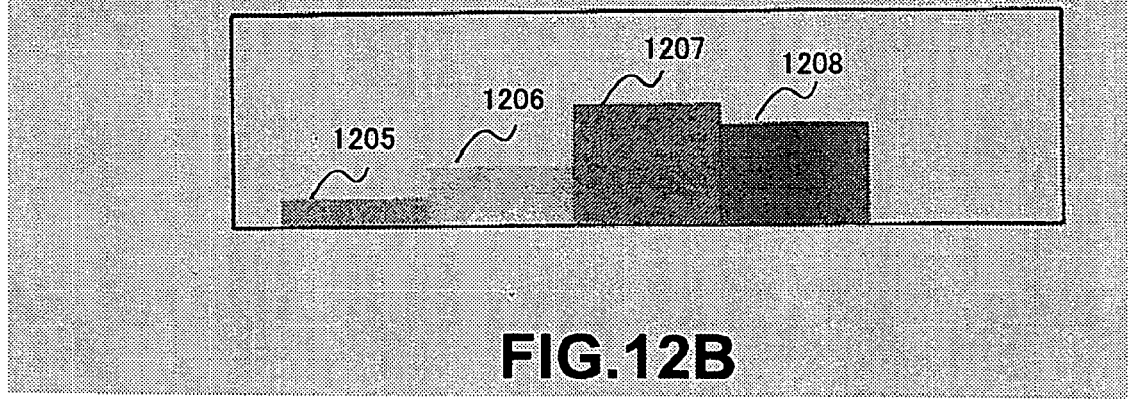

FIGS. 12A and 12B are explanatory drawing illustrating the results of a graph, which is non-embossing image data, being effectively embossed printed by selecting the embossing specification setting pattern of the graph form pattern A in the embossed printing setting dialog screen 301.

FIG. 12A illustrates a graph which is embossed printed after embossed image data being created by the embossing specification setting pattern of the graph form pattern A from a bar graph which is given with the bars being provided with different colors.

The graph form pattern A is an embossing specification setting pattern with which the amounts of area of the graphical bars having different colors are caused to be reflected to the heights.

FIG. 12B illustrates a sectional view when the graph as shown in FIG. 12A that is embossed printed is cut along line 1210.

The bar 1201, the bar 1202, the bar 1203, and the bar 1204 in FIG. 12A correspond to a sectional view 1205, a sectional view 1206, a sectional view 1207, and a sectional view 1208 in FIG. 12B, respectively.

In this way, the heights are embossed printed, being adjusted such that they are in proportion to the areas of the bars in the bar graph as shown in FIG. 12A.

The user who views the graph which is embossed printed can determine the magnitudes of the respective values represented by the graph not only by the lengths of the bars in the bar graph, but also by the heights of the bars which are embossed printed, thus the contents of the graph can be more effectively expressed, and the graph embossed printed can be utilized as a graph for visually handicapped persons.

When the original data of the non-embossed printing image which the user wants embossed printing is graph form data, the embossing specification setting pattern of the graph form pattern A is selected from the embossed printing setting dialog screen 301, and the graph form data is effectively embossed printed as shown in FIG. 12, for example.

As with the bar graph, the pie graph can also be effectively embossed printed by representing the respective portions indicating the values of the graph with different colors, and using the embossing specification setting pattern for setting the heights in proportion to the areas of the portions occupied by the colors.

As with the bar graph and the circle graph, the polygonal line graph can also be effectively embossed printed by creating a polygonal line graph such that the brightnesses of the colors of the respective line segments differ from one another according to the magnitudes of the values indicated by the respective line segments, and using the embossing specification setting pattern for setting the heights of the embossed prints according to the brightnesses of the colors for providing a greater height for an embossed printed portion which value indicated by the line segment is greater.

The embossed printing processing apparatus according to the present invention may be a multifunction machine like system in which the image input section 201, the image processing section 202, and the image forming section 203 as shown in FIG. 2 are integrated as a unit.

Further, the embossed printing processing apparatus according to the present invention may be adapted such that the scope of the non-embossed image data to which the embossing specification setting pattern is applied is set for each particular page or each particular object rather than the embossing specification setting pattern being applied to all the non-embossed image data.

Or, the embossed printing processing apparatus according to the present invention may be adapted such that the scope of the non-embossed image data to which the embossing specification setting pattern is applied is arbitrarily set.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-278107 filed on Sep. 24, 2004 including specification, claims, drawings and abstract is incorporated herein by reference in its entirety.

What is claimed is:

1. An embossed printing processing apparatus for carrying out embossed printing comprising:

an extracting unit that extracts attribute values of a non-embossed image from non-embossed image data;

a storing unit that preliminarily and separately creates and stores therein a plurality of embossing specification setting patterns that set conversion specifications for converting the attribute values of the non-embossed image that are extracted by the extracting unit into height data in correspondence to a type of the attribute values of the non-embossed image;

a selecting unit that selects a desired embossing specification setting pattern in correspondence to the type of the attribute values of the non-embossed image extracted by the extracting unit from among the plurality of embossing specification setting patterns stored in the storing unit in creating the embossed image data from the non-embossed image data;

an embossed image data creating unit that converts the attribute values of the non-embossed image into the height data by using the embossing specification setting pattern selected by the selecting unit and creates the embossed image data in correspondence to the non-embossed image data; and a transmitting unit that transmits the non-embossed image data and the embossed image data created by the embossed image data creating unit to an image forming apparatus.

2. The embossed printing processing apparatus of claim 1, wherein the extracting unit extracts color information included in the non-embossed image data as one attribute value, the selecting unit selects an embossing specification setting pattern that converts the color information into the height data as the one attribute value from among the plurality of embossing specification setting patterns stored in the storing unit, and the embossed image data creating unit converts the color information included in the non-embossed image into the height data by using the embossed specification setting pattern selected by the selecting unit to create the embossed image data.

3. The embossed printing processing apparatus of claim 1, wherein the extracting unit extracts font type information included in the non-embossed image data as one attribute value, the selecting unit selects an embossing specification setting pattern converting the font type information as the one attribute value into the height data among the embossing specification setting patterns stored in the storing unit, and the embossing image data creating unit converts the font type information included in the non-embossed image into the height data by using the embossing specification setting pattern selected by the selecting unit to create the embossed image data.

4. The embossed printing processing apparatus of claim 1, wherein the extracting unit extracts watermark pattern information included in the non-embossed image data as one attribute value, the selecting unit selects an embossing specification setting pattern that converts the watermark pattern information into the height data as the one attribute value from among the plurality of embossing specification setting patterns stored in the storing unit, and the embossed image data creating unit converts the watermark pattern information included in the non-embossed image data into the height data by using the embossed specification setting pattern selected by the selecting unit to create the embossed image data.

5. The embossed printing processing apparatus of claim 1, wherein
the plurality of embossing specification setting patterns involve a setting for specifying an embossed shape including an edge portion of an embossed region included in the embossed image data.

6. The embossed printing processing apparatus of claim 1, wherein
the plurality of embossing specification setting patterns are set in correspondence to a type of the non-embossed image data, and
the selecting unit selects a desired embossing specification setting pattern in correspondence to the type of the non-embossed image data from among the plurality of embossing specification setting patterns stored in the storing unit.

7. The embossed printing processing apparatus of claim 1, wherein the embossing specification setting patterns are managed while being given a name thereto, and installed and stored in the storing unit through an external terminal or a storage medium.

8. A method for controlling an embossed printing processing apparatus, comprising:
extracting attribute values of a non-embossed image from non-embossed image data;
creating and storing therein preliminarily and separately a plurality of embossing specification setting patterns that set conversion specifications for converting the attribute values of the non-embossed image thus extracted into height data in correspondence to a type of the attribute values of the non-embossed image;
selecting a desired embossing specification setting pattern in correspondence to the type of the attribute values of the non-embossed image thus extracted from among the stored plurality of embossing specification setting patterns in creating the embossed image data from the non-embossed image data;
converting the attribute values of the non-embossed image into the height by using the selected embossing specification setting pattern and creating the embossed image data in correspondence to the non-embossed image data; and
transmitting the non-embossed image data and the crated embossed image data using the non-embossed image data to an image forming apparatus.

9. A computer readable medium storing a program causing a computer to execute a process for carrying out embossed printing, the process comprising:
extracting attribute values of a non-embossed image from non-embossed image data;
creating and storing therein preliminarily and separately a plurality of embossing specification setting patterns that set conversion specifications for converting the attribute values of the non-embossed image thus extracted into height data in correspondence to a type of the attribute values of the non-embossed image;
selecting a desired embossing specification setting pattern in correspondence to the type of the attribute values of the non-embossed image thus extracted from among the stored plurality of embossing specification setting patterns in creating the embossed image data from the non-embossed image data;
converting the attribute values of the non-embossed image into the height by using the selected embossing specification setting pattern and creating the embossed image data in correspondence to the non-embossed image data; and
transmitting the non-embossed image data and the crated embossed image data using the non-embossed image data to an image forming apparatus.

\* \* \* \* \*